(12) United States Patent
Rose et al.

(10) Patent No.: US 8,176,832 B1
(45) Date of Patent: May 15, 2012

(54) SYSTEM AND METHOD FOR OBSTRUCTION DEFLECTION

(75) Inventors: Michael T. Rose, Royal Oak, MI (US); John J. Maniaci, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/005,814

(22) Filed: Jan. 13, 2011

(51) Int. Cl.
*F41H 5/02* (2006.01)
(52) U.S. Cl. .............. 89/36.08; 280/770; 296/187.07
(58) Field of Classification Search .............. 280/770; 296/187.07; 89/36.01, 36.07
See application file for complete search history.

(56) References Cited

U.S. PATENT DOCUMENTS

| | | | |
|---|---|---|---|
| 123,825 A | 2/1872 | Hamilton | |
| 339,632 A | 4/1886 | Eubanks | |
| 1,107,832 A | 8/1914 | Palis | |
| 1,167,122 A | 1/1916 | Simmons | |
| 1,614,856 A | 1/1927 | Overbeck, Jr. | |
| 2,916,324 A | 12/1959 | Graham | |
| 3,704,031 A | 11/1972 | Confer | |
| 3,815,941 A | 6/1974 | Snyder | |
| 4,101,897 A | 7/1978 | Morrison | |
| 4,838,592 A | 6/1989 | Sobodos et al. | |
| 5,401,074 A * | 3/1995 | Timerman | 296/136.02 |
| 5,586,785 A | 12/1996 | Warner et al. | |
| D593,079 S | 5/2009 | Schmitz et al. | |
| 7,594,561 B2 * | 9/2009 | Hass et al. | 180/299 |
| D626,118 S | 10/2010 | Schmitz | |
| 8,011,285 B2 * | 9/2011 | Farinella et al. | 89/36.08 |
| 2011/0252955 A1 * | 10/2011 | Radstake et al. | 89/36.02 |

* cited by examiner

*Primary Examiner* — J. Allen Shriver, II
*Assistant Examiner* — James Triggs
(74) *Attorney, Agent, or Firm* — David L. Kuhn; Thomas W. Saur; Luis Miguel Acosta (57) ABSTRACT

A system and a method for obstruction deflection for a vehicle. The system generally includes a guide; and a support structure. The support structure includes one or more supports; one or more guide connectors; a fixed single support bracket; a tilt bracket; and a fixed multiple support bracket. The fixed single support bracket, the tilt bracket, and the fixed multiple support bracket are mounted to the vehicle, a first end of each of the supports is installed onto the fixed single support bracket, the tilt bracket, and the fixed multiple support bracket, a second end of each of the supports is installed onto the guide connectors, and the guide is rotatably attached to the guide connectors such that the guide is positioned longitudinally on the vehicle and the guide is curved with the vehicle on the inside of the curve. When the tilt bracket is locked to prevent tilting, and the vehicle is operated in either of a first direction and a second direction, and an obstruction is encountered by the guide, cooperative flexing of the guide and of the supports in combination deflects the obstruction away from the vehicle.

20 Claims, 7 Drawing Sheets

SYSTEM AND METHOD FOR OBSTRUCTION DEFLECTION

GOVERNMENT INTEREST

The invention described here may be made, used and licensed by and for the U.S. Government for governmental purposes without paying royalty to us.

BACKGROUND OF THE INVENTION

1. Field of the Invention

The present invention generally relates to a system and a method for obstruction deflection.

2. Background Art

Moving vehicles can encounter obstructions that interfere with the vehicle or with attachments that are affixed to the outside of the vehicle. Such obstructions include naturally occurring objects such as tree limbs, branches, vines, brush, and the like; and man-made objects such as wires, fences, cables, signs, bridges, and the like. Conventional systems for deflection of such obstructions are typically rigid metal bars. Overhead obstructions can be particularly problematic as conventional metal bar obstruction deflection systems can snag on the obstructions thus causing damage to the obstruction deflection systems and, similarly, conventional metal bar obstruction deflection systems can snag on the obstructions causing damage to the obstruction (e.g., disrupting utility service, defacing infrastructures, scarring trees, destroying foliage, etc.).

Some conventional systems include a tilt or "break away" feature (e.g., spring loaded tilt and reset mechanism); however, many of such conventional systems only operate when the vehicle is moving in one direction (e.g., forward). When operated in another direction (e.g., vehicle reverse direction), such conventional systems are often ineffective. Even systems that operate in both forward and reverse vehicle directions often snag on the obstruction rather than deflect the obstruction. Further, such conventional systems may be complex, expensive, and prone to failure.

Yet further, metal bar conventional deflection systems can present interference or reduction in performance to the electromagnetic operation of antennas that are protected from physical damage by the deflection system; and occupants of the vehicles can suffer electrocution when electric utility lines are encountered by metal bar conventional deflection systems.

Thus, there exists a need and an opportunity for an improved system and method for deflection of vehicle obstructions. Such improved system and method may overcome one or more of the deficiencies of the conventional approaches.

SUMMARY OF THE INVENTION

According to the present invention, an obstruction deflection system for a vehicle is provided. The system generally includes a guide; and a support structure. The support structure includes one or more supports; one or more guide connectors; a fixed single support bracket; a tilt bracket; and a fixed multiple support bracket. The fixed single support bracket, the tilt bracket, and the fixed multiple support bracket are mounted to the vehicle, a first end of each of the supports is installed onto the fixed single support bracket, the tilt bracket, and the fixed multiple support bracket, a second end of each of the supports is installed onto each of the guide connectors, and the guide is rotatably attached to the guide connectors such that the guide is positioned longitudinally on the vehicle and the guide is curved with the vehicle on the inside of the curve. When the tilt bracket is locked in an upright position to prevent tilting, and the vehicle is operated in either of a first direction and a second direction and an obstruction is encountered by the guide, cooperative flexing of the guide and of the supports in combination generally deflects the obstruction away from the vehicle.

Two of the guides and support structures are generally positioned substantially in parallel, and coupled together via a cross bar and T-shaped couplings in a ladder shaped structure.

Attachments are generally mounted on the outer surface of the vehicle, and the guide extends from the vehicle at a distance beyond the distance at which the attachments extend from the vehicle such that the system provides obstruction deflection protection to the vehicle and to the attachments.

The guide is generally made from at least one of fiberglass, poly vinyl chloride (PVC), and chlorinated PVC (CPVC).

The supports are generally made from at least one of fiberglass, poly vinyl chloride (PVC), and chlorinated PVC (CPVC).

The guide connector includes a tubular shaped body, a pair of ears each having a hole there through, and a tab; and a first end of the body is sized to receive the second end of the support, a radial side of the body has a threaded portion that receives a bolt, a second end of the body includes the ears and the tab, the portion of each of the ears that includes the holes is offset from the longitudinal axis of the body, the tab opposes the ears and is at an acute angle relative to the body, and the guide connector is implemented such that the ears are pointed towards the first direction of the vehicle and the tab is pointed towards the second direction of the vehicle.

The fixed multiple support bracket includes a first spar retention tube that extends in the second direction longitudinally and horizontally, and a second spar retention tube that extends in the second direction and at an angle between a substantially vertical and a substantially horizontal angle.

The system fixed single support bracket, the tilt bracket, and the fixed multiple support bracket are generally connected to the vehicle via at least one of bolts, rivets, and welding.

The second direction of vehicle operation may be substantially opposite to the first direction.

The cross bar is generally made from at least one of fiberglass, poly vinyl chloride (PVC), and chlorinated PVC (CPVC).

Further, according to the present invention, a method for vehicle obstruction deflection is provided. The method generally includes mounting a support structure to the vehicle; and attaching a guide to the support structure. The support structure includes one or more supports; one or more guide connectors; a fixed single support bracket; a tilt bracket; and a fixed multiple support bracket. The fixed single support bracket, the tilt bracket, and the fixed multiple support bracket are generally mounted to the vehicle, a first end of each of the supports is installed onto the fixed single support bracket, the tilt bracket, and the fixed multiple support bracket, a second end of each of the supports is installed onto each of the guide connectors, and the guide is rotatably attached to the guide connectors such that the guide is positioned longitudinally on the vehicle and the guide is curved with the vehicle on the inside of the curve. When the tilt bracket is locked in an upright position to prevent tilting, and the vehicle is operated in either of a first direction and a second direction, and an obstruction is encountered by the guide, cooperative flexing of the guide and of the supports in combination generally deflects the obstruction away from the vehicle.

Two of the guides and support structures are generally positioned substantially in parallel, and coupled together via a cross bar and T-shaped couplings in a ladder shaped structure.

Attachments are generally mounted on the outer surface of the vehicle, and the guide extends from the vehicle at a distance beyond the distance at which the attachments extend from the vehicle to provide obstruction deflection protection to the vehicle and to the attachments.

The guide is generally made from at least one of fiberglass, poly vinyl chloride (PVC), and chlorinated PVC (CPVC).

The supports are generally made from at least one of fiberglass, poly vinyl chloride (PVC), and chlorinated PVC (CPVC).

The guide connector includes a tubular shaped body, a pair of ears each having a hole there through, and a tab; and a first end of the body is sized to receive the second end of the support, a radial side of the body has a threaded portion that receives a bolt, a second end of the body includes the ears and the tab, the portion of each of the ears that includes the holes is offset from the longitudinal axis of the body, the tab opposes the ears and is at an acute angle relative to the body, and the guide connector is implemented such that the ears are pointed towards the first direction of the vehicle and the tab is pointed towards the second direction of the vehicle.

The fixed multiple support bracket includes a first spar retention tube that extends in the second direction longitudinally and horizontally, and a second spar retention tube that extends in the second direction and at an angle between a substantially vertical and a substantially horizontal angle.

The fixed single support bracket, the tilt bracket, and the fixed multiple support bracket are connected to the vehicle via at least one of bolts, rivets, and welding.

The second direction of vehicle operation may be substantially opposite to the first direction.

The cross bar is generally made from at least one of fiberglass, poly vinyl chloride (PVC), and chlorinated PVC (CPVC).

The above features, and other features and advantages of the present invention are readily apparent from the following detailed descriptions thereof when taken in connection with the accompanying drawings.

DETAILED DESCRIPTION OF THE PREFERRED EMBODIMENT(S)

Definitions and Terminology

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, characteristic, parameter, dimension, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

For a vehicle, and a system mounted on or used in connection with the vehicle, forward/reverse (longitudinal) and vertical (up/down) directions are generally relative to the vehicle and system as typically operated (e.g., when the vehicle is operated with the respective powertrain in a forward/reverse mode). As such, lateral (left/right) directions are generally perpendicular to the longitudinal/vertical plane, and are referenced from a vehicle operator (e.g., driver) perspective. A first direction (e.g., forward) and a second direction (e.g., rearward or reverse) where the second direction substantially, but not necessarily wholly, opposes the first direction are also generally or used in connection with the vehicle. Referenced directions are generally as shown on FIG. 3 unless otherwise noted.

The present invention is generally directed to a system and a method for obstruction deflection. The system and method may advantageously be implemented in connection with (i.e., mounted on, attached to, fastened on, bolted upon, etc.) vehicles that are prone to hitting (intersecting, impacting, etc.) obstructions (e.g., utility service, infrastructures, trees, foliage, and the like). In such implementations, the obstruction deflection system and method may reduce, eliminate or mitigate damage or destruction of the overhead obstructions and items (e.g., attachments, devices, fixtures, etc.) that are mounted (i.e., attached, fixed, installed, etc.) on outer surfaces of the vehicles by deflecting the obstructions via cooperative, compliant motion of resilient, flexible elements of the system in response to intersection of the system with the obstructions while preventing intersection of the obstructions with the vehicle or items attached to the outer surfaces of the vehicles. Attachments to the vehicle may include such devices as antennae, weapons, loudspeakers, microphone arrays, cameras, etc.

With reference to the Figures, the preferred embodiments of the present invention will now be described in detail. Generally, the present invention provides an improved system and method for vehicle obstruction deflection.

Figure 1:
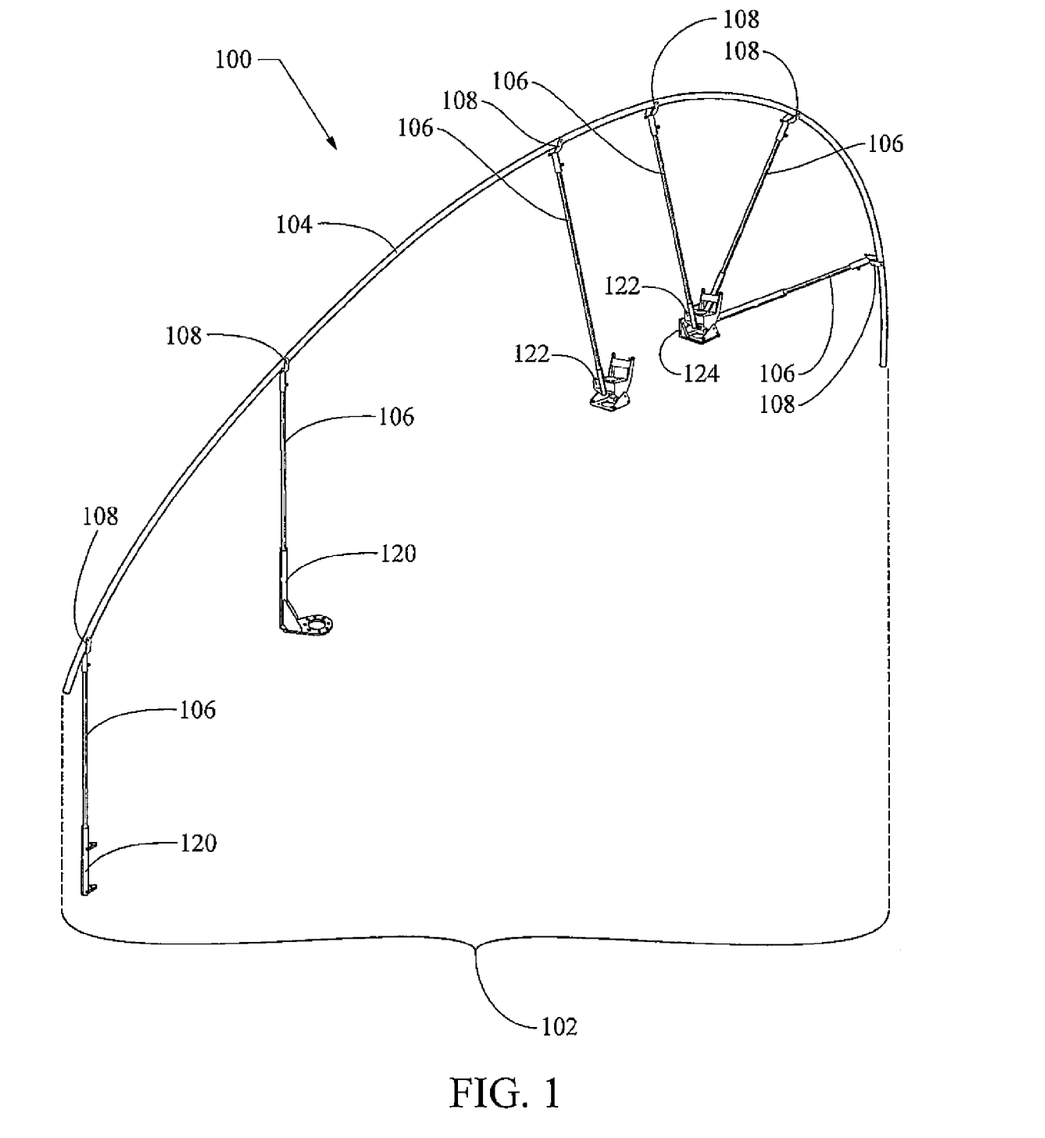
FIG. 1 is an isometric view of an embodiment from the upper, left, front point of view of a system for obstruction deflection.

Referring to FIG. 1, an isometric view of an embodiment of an obstruction deflection system (e.g., subsystem, apparatus, and the like) 100 is shown. The system 100 generally comprises a support structure 102 and a guide (i.e., rail, guide rail, bow, rod, bar, deflector, etc.) 104. The guide 104 generally comprises one or more supports (i.e., posts, uprights, spars, masts, risers, etc.) 106, guide brackets (i.e., joints, connectors, etc.) 108, fixed single support brackets (i.e., mounts) 120, tilt brackets 122, and fixed multiple support brackets 124.

The bow 104 is generally articuably (e.g., rotationally, rotatably) connected to a first end of the uprights 106 via the connectors 108, and a second end of the uprights 106 is generally connected to a vehicle where the system 100 is implemented (see, for example, FIGS. 3 and 4) via the fixed single support brackets 120, the tilt brackets 122, and the fixed multiple support brackets 124. The connection between the second end of the mast 106 and the brackets 120, 122, and 124 is generally a fixed (i.e., non-rotational) connection.

The bow 104 is generally implemented as a long, cylindrically shaped structure (i.e., pipe, tube, rod, pole, etc.). The deflector 104 is generally made from a sturdy, compliant (i.e., yieldable, flexible, resilient), drillable, non-electrically conductive material such as fiberglass, poly vinyl chloride (PVC), and chlorinated PVC (CPVC). Such sturdy, compliant materials may be shaped into an arcuate (i.e., partially bent, curved, bowed, etc.) configuration that is both protective of structures and rugged. Further, implementation of the guide 104 using such non-electrically conductive material generally avoids electronic interference (e.g., radio frequency interference (RFI)) and risk of electrocution that can result when conventional materials such as metallic rods are used. The guide 104 may be implemented as a single, unitary part or, alternatively, as multiple parts that are coupled together to form an integral structure.

The posts 106 are generally implemented as rods and poles made from a sturdy, compliant (i.e., yieldable, flexible, resilient) non-electrically conductive material such as PVC, CPVC, and fiberglass.

The interfacing connections that are implemented between the deflector 104 and the joint 108 are generally flexible (i.e., articulating, rotating, rotatable, etc.). In one example, the joint 108 (described in one example in more detail in connection with FIGS. 7-9) may be implemented as a pin (revolute) joint where the pin is substantially lateral, and in another example (not shown), the joint 108 may be implemented as a ball and socket joint. As the rod 104 is generally made from a drillable material, when the connectors 108 are implemented having revolute joints, to mount the rod 104 to the connectors 108 a hole is formed (i.e., drilled, punched, pierced, and the like) through the rod 104 such that an axis member (e.g., a bolt, rivet, pin, etc.) is placed (installed) in the revolute joint as described in more detail below.

The fixed single support bracket 120 generally provides a substantially solid, non-moving connection between the second end of one spar 106 and the vehicle where the system 100 is implemented. The fixed single support bracket 120 generally orients (points) the spar 106 in a substantially vertical direction.

With the improvement (i.e., distinction, difference, update, etc.) described below in connection with FIGS. 12-14, the tilt bracket 122 is generally implemented substantially as shown in U.S. Pat. No. D593,079; "Antenna tip-over mount"; granted to Schmitz, et al. on May 6, 2009; which is incorporated by reference in its entirety herein. The tilt bracket 122 is generally installed such that the spar 106 that is connected to the tilt bracket 122 is biased (i.e., angled, oriented, etc.) in the first (forward) direction when the tilt bracket 122 is in an un-tilted position. When the system 100 is configured in a first mode (state, implementation, configuration, setup, etc.), the tilt bracket 122 is locked (i.e., pinned, bolted, held, fixed, and the like) to prevent (stop) tilting operation (motion, movement).

The fixed multiple support bracket 124 is generally implemented in connection with two or more of the supports 106. The fixed multiple support bracket 124 generally provides a substantially solid, non-moving connection between the second end of at least two of the spars 106 and the vehicle where the system 100 is implemented. One of the spars 106 that is connected to the fixed multiple support bracket 124 extends substantially in the second direction (i.e., rearward) longitudinally and horizontally between the fixed multiple support bracket 124 and the guide rail 104. At least one other of the spars 106 that is connected to the fixed multiple support bracket 124 extends in the second direction (rearward) between the fixed multiple support bracket 124 and the guide rail 104 longitudinally and at an angle between a substantially vertical and a substantially horizontal angle. As such, the deflector 104 is generally bent substantially downward both at the front and at the rear of the vehicle where the system 100 is implemented.

The interfacing connections that are implemented between the first end of the pole 106 and the joint 108, and between the second end of the pole 106 and the fixed single support brackets 120, the tilt brackets 122, and the fixed multiple support, brackets 124 are generally substantially solid, mechanical (e.g., bolted or set screwed) connections.

Figure 2:
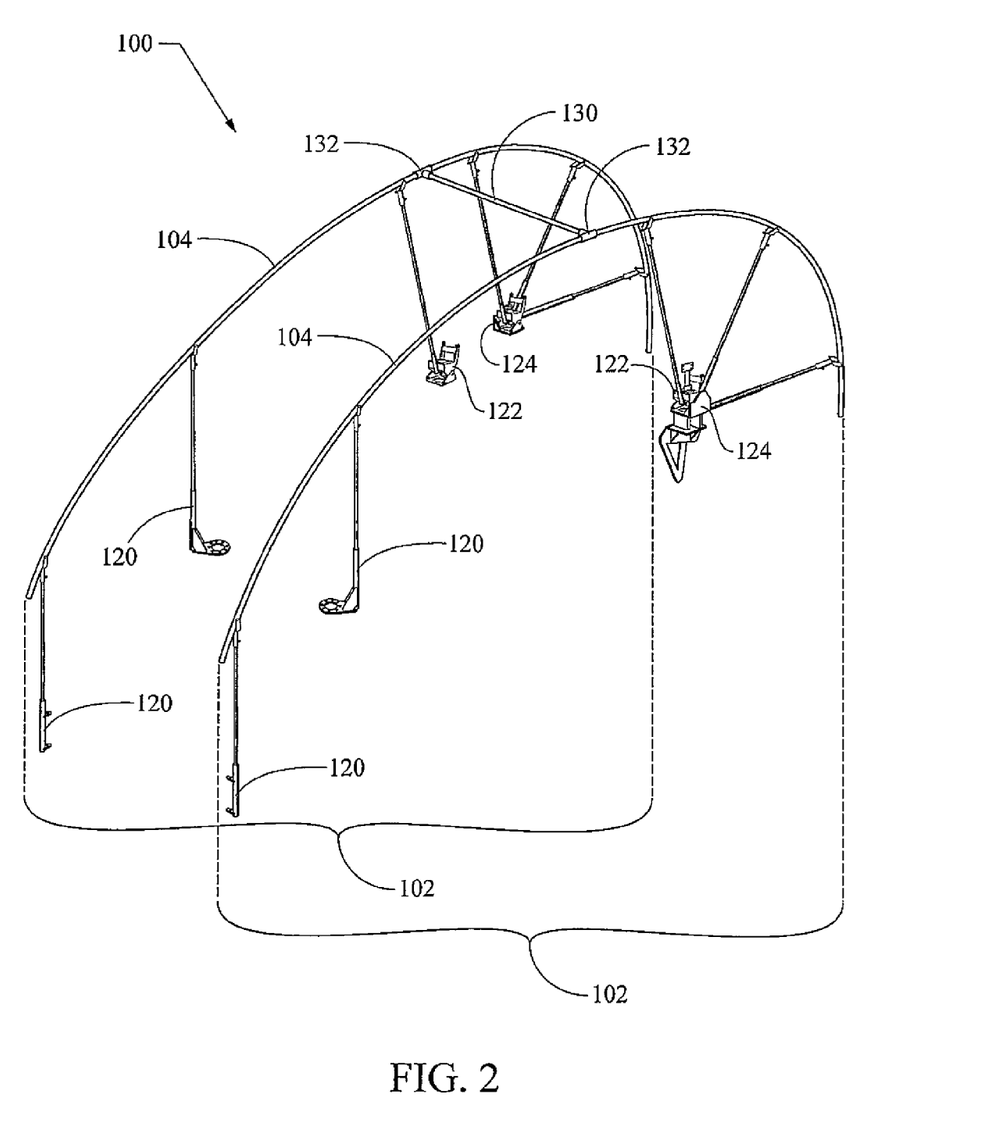
FIG. 2 is an isometric view of another embodiment from the upper, left, front point of view of the system for obstruction deflection.

Referring to FIG. 2, an isometric view of another embodiment of the system 100 is illustrated. The system 100 as illustrated on FIG. 2 generally comprises two or more of the system 100 embodiments as illustrated on FIG. 1 (i.e., the support structure 102 and the guide 106) combined as subsystems to form an "H" or "ladder" shaped structure. In particular, as illustrated on FIG. 2, the system 100 may include two or more of the guides 104 that are substantially parallel positioned and that are generally supported by the poles 106, the connectors 108 and the fixed single support brackets 120, the tilt brackets 122, and the fixed multiple support brackets 124; and may further include a cross bar (beam) 130 having two ends where each of the ends of the cross bar 130 are coupled to sections of the guides 104 via T-shaped couplings 132. The interfacing connections that are implemented between the ends of the cross bar 130 and the coupling 132, and between the sections of the guides 104 and the couplings 132 are generally substantially solid, mechanical (e.g., bolted or set screwed) connections. The cross bar 130 is generally implemented as a rod (e.g., pole) made from a sturdy, compliant (i.e., yieldable, flexible, resilient) non-electrically conductive material such as PVC, CPVC, and fiberglass.

Figure 3:
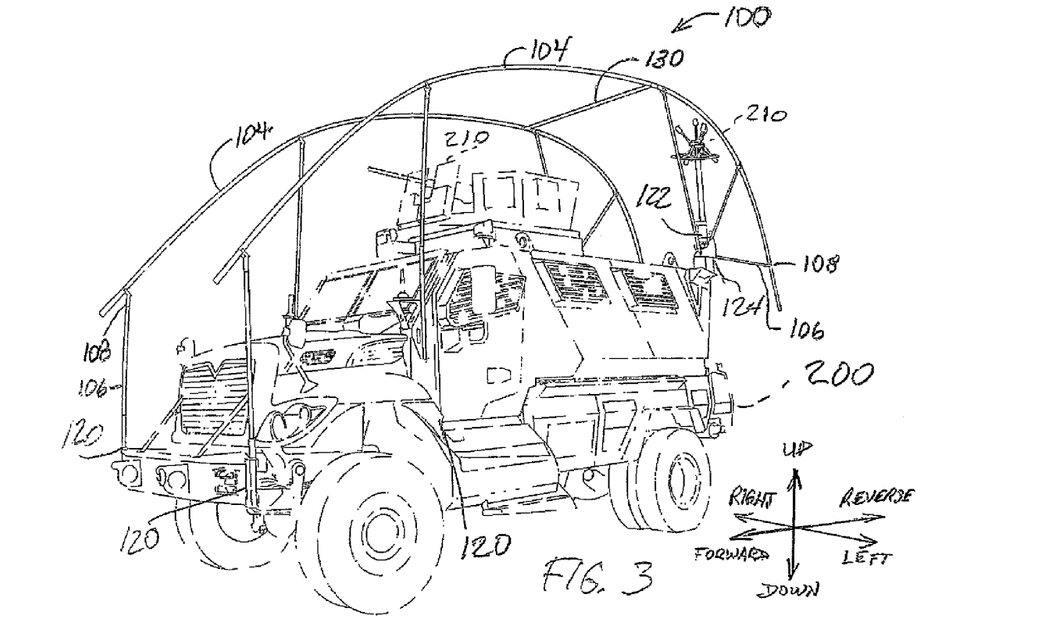
FIGS. 3 and 4 are isometric views of the embodiment of the system for obstruction deflection of FIG. 2 as installed on vehicles.
Figure 4:
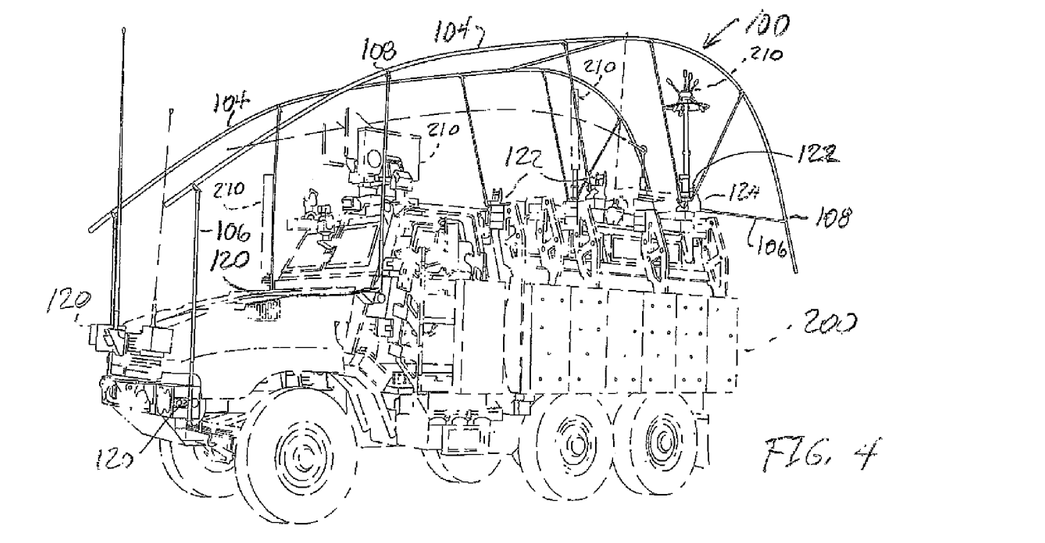

Referring to FIGS. 3 and 4, isometric views of embodiments of the system 100 as illustrated on FIG. 2 implemented in connection with (i.e., installed on, mounted on, etc.) vehicles 200 are illustrated. For clarity, the vehicles 200 and attachments 210 thereon are shown in phantom to illustrate an environment in which the system 100 may be implemented.

The fixed single support brackets 120, the tilt brackets 122, and the fixed multiple support brackets 124 are generally mounted to the vehicle 200 by secure, mechanical connections such as those formed via at least one of bolts, rivets, welding, etc. The system 100 may be mounted on the vehicle 200 such that the guides 104 are generally positioned longitudinally, and the guide 104 is generally curved with the vehicle 200 on the inside (i.e., concave side) of the curve. The system 100 may be mounted on the vehicle 200 such that the guides 104 extend from the vehicle 200 at a distance beyond the distance at which the attachments 210 extend from the vehicle such that the system 100 generally provides obstruction deflection protection to the vehicle 200 and to the attachment 210. In another example, the system 100 may be installed on a vehicle 200 when no attachment 210 is installed on the vehicle 200.

The fixed single support brackets 120, the tilt brackets 122, and the fixed multiple support brackets 124 in combination with the spars 106 and the joints 108 are generally sized and positioned such that the guides 104 are bowed (curved) above the vehicle 200 and the attachments 210 thereon. As such, when the system 100 is configured with the tilt bracket 122 in a locked, upright position, and the vehicle 200 is operated in either of a first (forward) direction and a second (reverse) direction, and an obstruction is encountered by the system 100 (i.e., by the guide 104), cooperative flexing of the guide 104 and the spar 106 in combination generally deflects (i.e., slides, moves, pushes, glides, etc.) the obstruction away from the vehicle 200 and the attachment 210.

Figure 5:
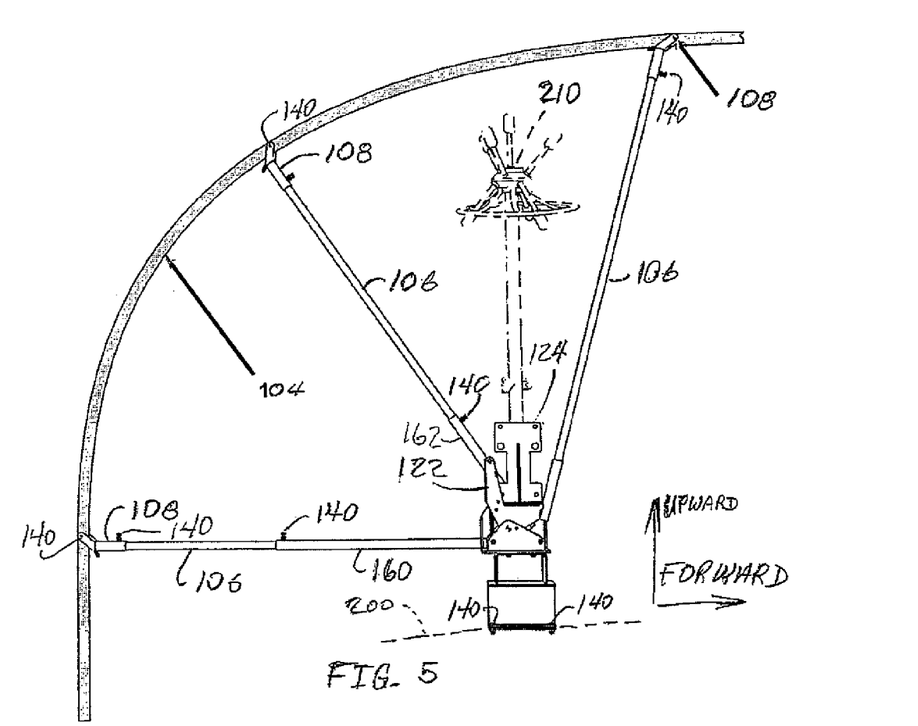
FIG. 5 is a broken left side elevation view of the left, rear portion of the embodiment of the system for obstruction deflection of FIG. 2.

Referring to FIG. 5, a broken left side elevation view of the left, rear portion of the system 100 is illustrated. Bolts 140 may be installed to provide an axis between the rod 104 and the joint 108; and to provide mechanical connections between the support 106 and the joint 108, the support 106 and the tilt bracket 122, the support 106 and the fixed multiple support bracket 124, and the fixed multiple support bracket 124 and the vehicle 200. While not illustrated in FIG. 5, as described above (see also, FIG. 10 and associated description), similar secure mechanical (e.g., bolted) connections may be implemented in connection with the support 106 and the fixed single support bracket 120, and the fixed single support bracket 120 and the vehicle 200.

Figure 6:
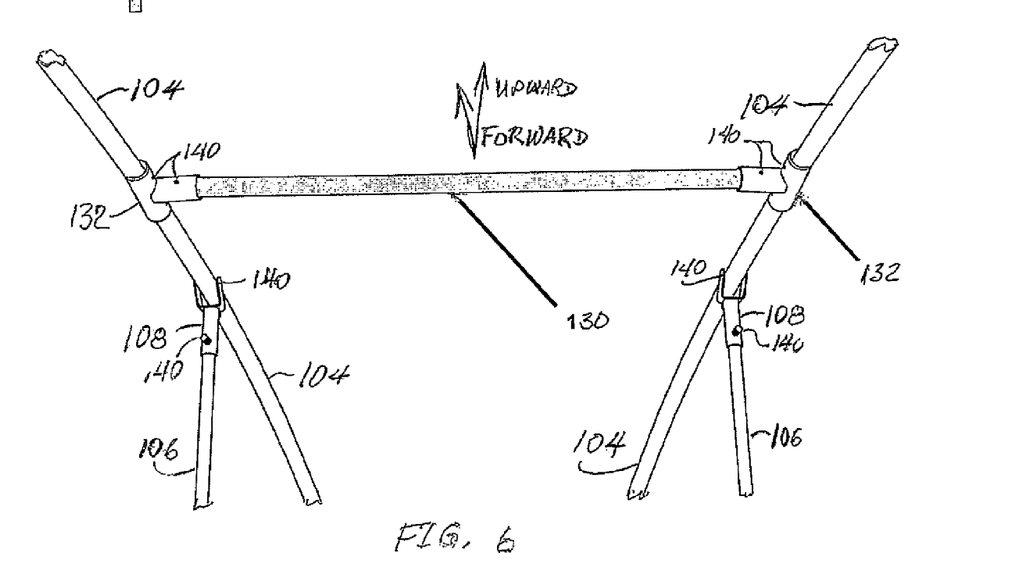
FIG. 6 is a broken view from below of the center portion of the embodiment of the system for obstruction deflection of FIG. 2.

Referring to FIG. 6, a broken view from below and towards the rear of the center portion of the embodiment the system 100 as illustrated on FIGS. 2-4 is shown. The bolt 140 may be implemented to provide mechanical connections between the bow 104 and the coupling 132, and the cross bar 130 and the coupling 132. For convenience, the bow 104 may be implemented in two sections that are substantially butted together within the coupling 132.

Figure 7:
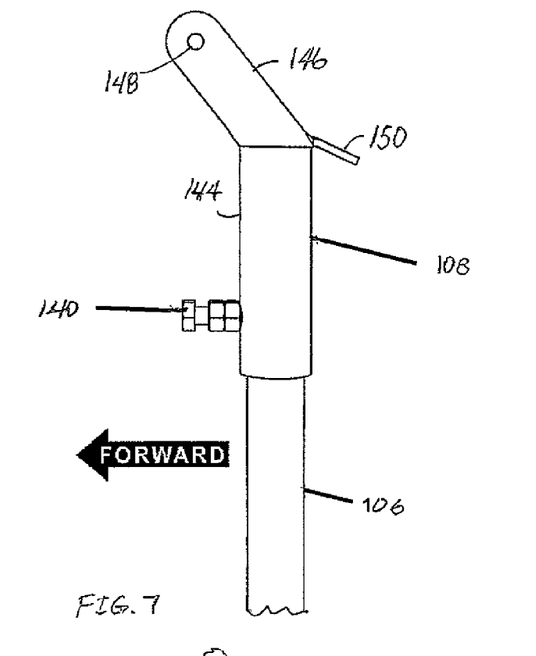
FIG. 7 is a side elevation view of an embodiment a guide bracket of the system of FIGS. 1 and 2.
Figure 8:
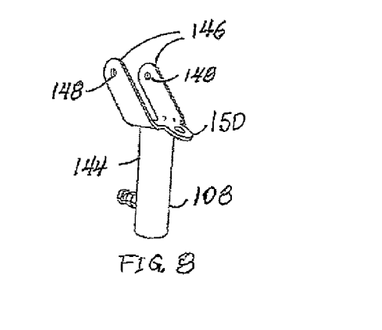
FIG. 8 is an isometric view of the guide bracket of FIG. 7.
Figure 9:
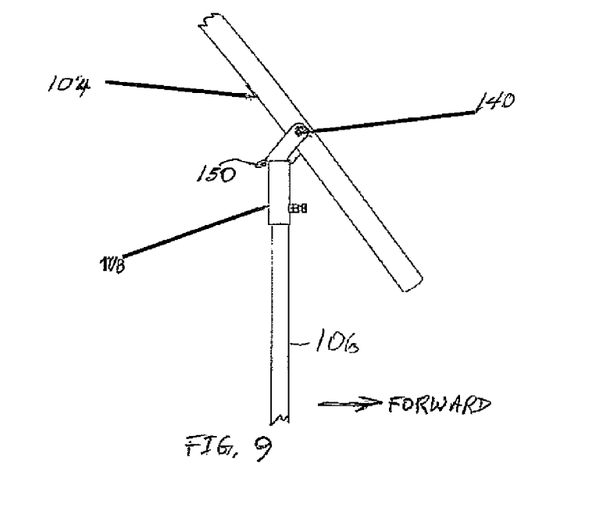
FIG. 9 is a broken isometric view of a portion of illustrating additional detail of the guide bracket of FIG. 7.

Referring to FIGS. 7-9, an example of an embodiment the guide bracket 108 is illustrated. FIG. 7 is a side elevation view of the guide bracket 108, FIG. 8 is an isometric view of the guide bracket 108, and FIG. 9 is a broken isometric view of a portion of illustrating additional detail of the guide bracket 108. The connector 108 generally comprises a tubular shaped body 144, a pair of ears (flanges) 146 each having a hole 148 there through, and a tab (extension) 150.

A first end of the body 144 is generally sized to receive the first end of the spar 106. The radial side of the body 144 generally has a threaded portion that may receive the bolt 140. A second end of the body 144 generally includes the ears 146 and the tab 150. The portion of the ear 146 that includes the hole 148 is generally offset from the longitudinal axis of the body 144. The tab 150 generally opposes the ear 146, and may be at an acute angle relative to the body 144. The joint 108 is generally implemented such that the ears 146 are pointed towards the first (forward) direction of the vehicle 200, and the tab 150 is pointed towards the second (rearward) direction of the vehicle 200.

Figure 10:
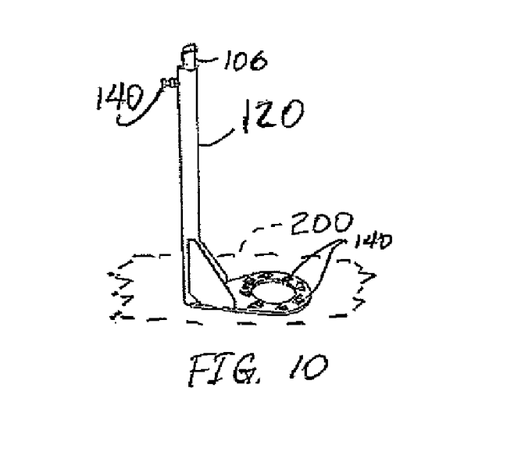
FIG. 10 is an isometric view of an example of a fixed single support bracket of the system of FIGS. 1 and 2.

Referring to FIG. 10, an isometric view of an example of the fixed single support bracket 120 is illustrated as installed on the vehicle 200 via the bolts 140. In other examples (not shown), structure similar to the illustrated example of the fixed single support bracket 120 may be implemented to meet the design criteria (e.g., size, shape, number of attachment holes, etc.) of a particular application, as understood by one of ordinary skill.

Figure 11:
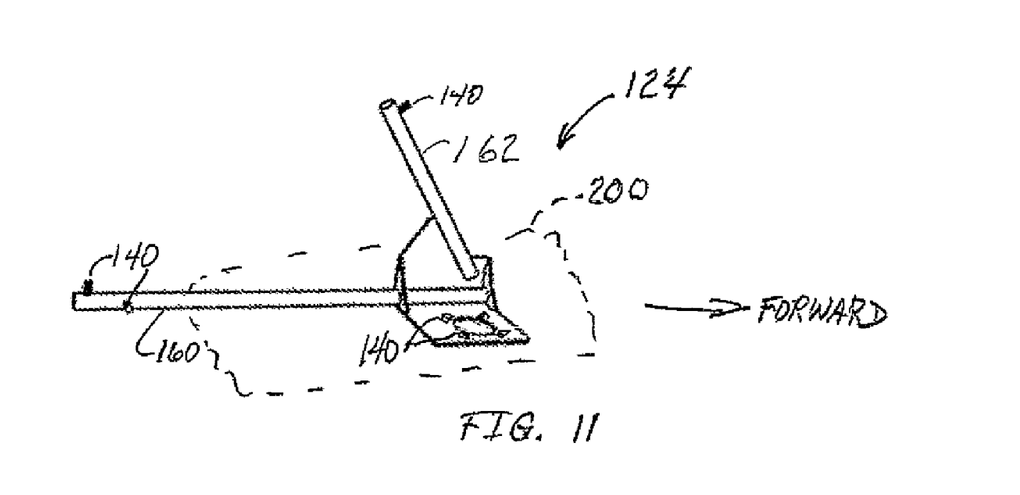
FIG. 11 is an isometric view of an example of a fixed multiple support bracket of the system of FIGS. 1 and 2.

Referring FIG. 11, an isometric view of an example of the fixed multiple support bracket 124 is illustrated, as installed on the vehicle 200 via the bolts 140. The fixed multiple support bracket 124 generally comprises a first spar retention tube 160 that extends in the second direction (rearward) longitudinally and horizontally, and a second spar retention tube 162 that extends in the second direction (rearward) and at an angle between a substantially vertical and a substantially horizontal angle (i.e., at an acute angle). In other examples (not shown), structure similar to the illustrated example of the fixed multiple support bracket 124 may be implemented to meet the design criteria (e.g., size, shape; number of attachment holes, etc.) of a particular application, as understood by one of ordinary skill.

Figure 12:
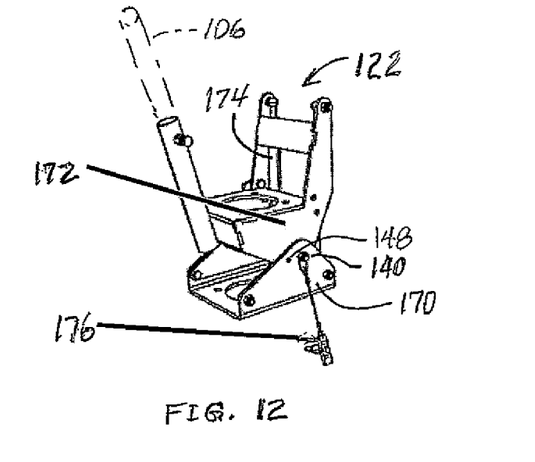
FIGS. 12 and 13, isometric views from the upper, left and right, respectively, looking rearward of a tilt bracket of the system of FIGS. 1 and 2.
Figure 13:
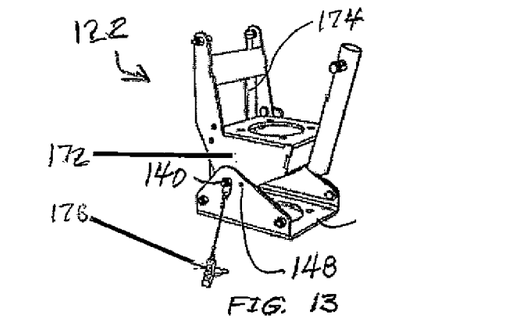

Referring to FIGS. 12 and 13, isometric views from the upper, left and right, respectively, looking rearward of the tilt bracket 122 are illustrated. The tilt bracket 122 is generally implemented as an improved version of the tilt bracket of U.S. Pat. No. D593,079. The tilt bracket of U.S. Pat. No. D593,079 is improved, herein, via the addition of a tilt locking mechanism. The tilt bracket 122 generally comprises a base 170, a cradle 172, two struts 174, and a lock pin (e.g., dowel, fastening rod, peg, etc.) 176 (illustrated with a lanyard that may retain the lock pin 176 to the tilt bracket 122). In addition, bolts 140 may be implemented in connection with holes 148 in the tilt bracket 122. Holes 148 in the base 170 and the cradle 172 on each side may be cooperatively aligned and sized to receive either one long or two short bolts 140 such that the bolt 148 may act as an axis for a tilting motion of the cradle 172 from an upright position to a back (or rearward) position. For an illustration of the tilting motion of the cradle 172, see, for example, U.S. Pat. No. D593,079 on FIGS. 1, 4, and 5.

The base 170 and the cradle 172 may also include additional holes 148 on each side that may be cooperatively aligned and sized to receive the lock pin 176. When installed through the mating holes 148 in the base 170 and the cradle 172, the lock pin 176 generally prevents the tilt bracket 122 from tilting (i.e., the lock pin 176 generally fixes the tilt bracket 122). FIGS. 12 and 13 illustrate the locking pin 176 in an un-installed position such that the tilt bracket 122 may tilt.

The lock pin 176 is generally implemented as a quick-release pin having a retention feature (e.g., internal retention 'hairpin' springs, spring loaded balls, and the like) that generally prevents the lock pin 176 from coming loose during normally expected operation of the vehicle 200 and yet allow an operator to remove the lock pin 176 without tools, as would be known to one of skill in the art. In one example, the lock pin 176 may be implemented as a push-pull quick-release pin, wherein the pin 176 comprises a solid or hollow shank containing a detent assembly that includes a locking lug, button, or ball that is backed up (urged into position) by a resilient member such as a core, plug, or spring. In another example, the lock pin 176 may be implemented as a positive locking single-acting or double-acting quick-release pin. The single-acting quick-release example of the pin 176 generally comprises a plunger-actuated locking mechanism with a locking element that extends from the pin shank surface to provide a positive lock, and when a button or lever is actuated, the locking element generally retracts. The double-acting quick-release example of the pin 176 generally comprises a bi-directional plunger, and movement of the plunger in either direction may release the locking element.

In yet another example, the lock pin 176 may be implemented as a bolt 148 in connection with an appropriate nut.

Figure 14:
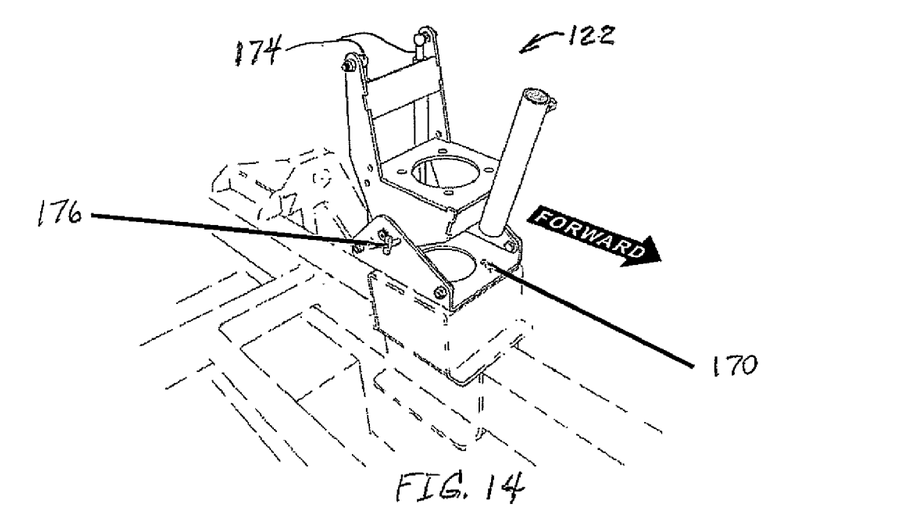
FIG. 14 is another isometric view of the tilt bracket of FIGS. 12 and 13.

Referring to FIG. 14, an isometric view from the upper, right, looking rearward of the tilt bracket 122 is illustrated. The tilt bracket 122 is shown having the lock pin 176 installed such that the tilt bracket 122 is fixed and, thus, does not generally tilt.

When the system 100 is configured without the lock pin 176 installed to prevent the tilt motion of the tilt bracket 122, the tilt bracket 122 may tilt back when an obstruction is encountered, and the system 100 also generally does not include the guides 104 and the guide brackets 108. The supports 106 may also be deleted. Thus, when the system 100 is configured such that the tilt bracket 122 may tilt, the system 100 generally implements the tilt motion of the tilt bracket 122 to provide obstruction deflection.

While the system 100 is illustrated and described in connection with mounting (installation, implementation, etc.) substantially on the top of the vehicle 200, the system 100 may be mounted on the sides, front, and or rear of the vehicle 200 such that obstruction deflection (and thus protection) may be provided to the respective surfaces of the vehicle 200 and the attachments 210.

As is apparent then from the above detailed description, the present invention may provide an improved system (i.e., the system 100) and method (e.g., proces, steps, etc. implemented in connection with the system 100) for obstruction deflection, especially but not necessarily exclusively, in connection with the vehicle 200. The system 100 and the associated method may include such advantageous features as:

Non-conductive supports (i.e., the support 106) and guide rails (i.e., the guide rail 104)—The system 100 generally uses non-conductive fiberglass; PVC, and CPVC tubing to guide live (electrified utility) wires over the vehicle 200, and thus generally ensures that high-voltage lines do not ground out through the vehicle 200 and the attachments 210, thereby endangering the crew and equipment.

Supports 106 and guide rails 104 are generally made from radio frequency (RF)-transparent materials (e.g., fiberglass, PVC, and CPVC)—The materials chosen for the supports 106 and guide rails 104 are generally selected to ensure minimal interference with communication and jamming equipment on-board the vehicle 200.

Double-sided—The system 100, in one embodiment (e.g., the embodiment illustrated on FIGS. 2-4 and 6), generally provides two guide rails 104 over the vehicle 200 to ensure more complete protection, even when approaching wires at an oblique angle.

Reverse as well as forward operation—The system 100 generally provides protection in both the first (forward) and second (reverse) direction of the vehicle 200 and to the attachments 210 to provide protection and mobility even in the confined spaces of an urban environment.

Room to grow—The system 100 is generally scalable (e.g., expandable, adaptable, and the like) to accommodate differing sizes and shapes of the vehicle 200 and the attachments 210 that may be installed on the outer surfaces of the vehicle 200.

Collapsible antennas—The system 100 generally includes the tilt-down brackets 122 that are implemented in connection with the hard-mounted attachments 210 (e.g., antennas and the like), to provide a crew of the vehicle 200 even more mobility options underneath low, rigid obstacles such as overpasses (e.g., the system 100 may have two modes of configuration).

Various alterations and modifications will become apparent to those skilled in the art without departing from the scope and spirit of this invention and it is understood this invention is limited only by the following claims.

What is claimed is:

1. An obstruction deflection system for a vehicle, the system comprising:
   a guide; and
   a support structure, wherein the support structure comprises
      one or more supports;
      one or more guide connectors;
      a fixed single support bracket;
   a tilt bracket; and
      a fixed multiple support bracket, and wherein
         the fixed single support bracket, the tilt bracket, and the fixed multiple support bracket are mounted to the vehicle,
         a first end of each of the supports is installed onto the fixed single support bracket, the tilt bracket, and the fixed multiple support bracket,
         a second end of each of the supports is installed onto each of the guide connectors, and the guide is rotatably attached to the guide connectors such that the guide is positioned longitudinally on the vehicle and the guide is curved with the vehicle on the inside of the curve; and
         when the tilt bracket is locked to prevent tilting, and the vehicle is operated in either of a first direction and a second direction, and an obstruction is encountered by the guide, cooperative flexing of the guide and of the supports in combination deflects the obstruction away from the vehicle.

2. The system of claim 1 wherein, two of the guides and support structures are positioned substantially in parallel, and coupled together via a cross bar and T-shaped couplings in a ladder shaped structure.

3. The system of claim 1 wherein, attachments are mounted on the outer surface of the vehicle, and the guide extends from the vehicle at a distance beyond the distance at which the attachments extend from the vehicle such that the system provides obstruction deflection protection to the vehicle and to the attachments.

4. The system of claim 1 wherein, the guide is made from at least one of fiberglass, poly vinyl chloride (PVC), and chlorinated PVC (CPVC).

5. The system of claim 1 wherein, the supports are made from at least one of fiberglass, poly vinyl chloride (PVC), and chlorinated PVC (CPVC).

6. The system of claim 1 wherein, the guide connector comprises a tubular shaped body, a pair of ears each having a hole there through, and a tab; and a first end of the body is sized to receive the second end of the support, a radial side of the body has a threaded portion that receives a bolt, a second end of the body includes the ears and the tab, the portion of each of the ears that includes the holes is offset from the longitudinal axis of the body, the tab opposes the ears and is at an acute angle relative to the body, and the guide connector is implemented such that the ears are pointed towards the first direction of the vehicle and the tab is pointed towards the second direction of the vehicle.

7. The system of claim 1 wherein, the fixed multiple support bracket comprises a first spar retention tube that extends in the second direction longitudinally and horizontally, and a second spar retention tube that extends in the second direction and at an angle between a substantially vertical and a substantially horizontal angle.

8. The system of claim 1 wherein, the fixed single support bracket, the tilt bracket, and the fixed multiple support bracket are connected to the vehicle via at least one of bolts, rivets, and welding.

9. The system of claim 1 wherein, the second direction is substantially opposite to the first direction.

10. The system of claim 2 wherein, the cross bar is made from at least one of fiberglass, poly vinyl chloride (PVC), and chlorinated PVC (CPVC).

11. A method of providing obstruction protection to a vehicle, the method comprising:
mounting a support structure to the vehicle; and
attaching a guide to the support structure, wherein the support structure comprises
one or more supports;
one or more guide connectors;
a fixed single support bracket;
a tilt bracket; and
a fixed multiple support bracket, and wherein
the fixed single support bracket, the tilt bracket, and the fixed multiple support bracket are mounted to the vehicle,
a first end of each of the supports is installed onto the fixed single support bracket, the tilt bracket, and the fixed multiple support bracket,
a second end of each of the supports is installed onto each of the guide connectors, and the guide is rotatably attached to the guide connectors such that the guide is positioned longitudinally on the vehicle and the guide is curved with the vehicle on the inside of the curve; and
when the tilt bracket is locked to prevent tilting, and the vehicle is operated in either of a first direction and a second direction, and an obstruction is encountered by the guide, cooperative flexing of the guide and of the supports in combination deflects the obstruction away from the vehicle.

12. The method of claim 11 wherein, two of the guides and support structures are positioned substantially in parallel, and coupled together via a cross bar and T-shaped couplings in a ladder shaped structure.

13. The method of claim 11 wherein, attachments are mounted on the outer surface of the vehicle, and the guide extends from the vehicle at a distance beyond the distance at which the attachments extend from the vehicle to provide obstruction deflection protection to the vehicle and to the attachments.

14. The method of claim 11 wherein, the guide is made from at least one of fiberglass, poly vinyl chloride (PVC), and chlorinated PVC (CPVC).

15. The method of claim 11 wherein, the supports are made from at least one of fiberglass, poly vinyl chloride (PVC), and chlorinated PVC (CPVC).

16. The method of claim 11 wherein, the guide connector comprises a tubular shaped body, a pair of ears each having a hole there through, and a tab; and a first end of the body is sized to receive the second end of the support, a radial side of the body has a threaded portion that receives a bolt, a second end of the body includes the ears and the tab, the portion of each of the ears that includes the holes is offset from the longitudinal axis of the body, the tab opposes the ears and is at an acute angle relative to the body, and the guide connector is implemented such that the ears are pointed towards the first direction of the vehicle and the tab is pointed towards the second direction of the vehicle.

17. The method of claim 11 wherein, the fixed multiple support bracket comprises a first spar retention tube that extends in the second direction longitudinally and horizontally, and a second spar retention tube that extends in the second direction and at an angle between a substantially vertical and a substantially horizontal angle.

18. The method of claim 11 wherein, the fixed single support bracket, the tilt bracket, and the fixed multiple support bracket are connected to the vehicle via at least one of bolts, rivets, and welding.

19. The method of claim 11 wherein, the second direction is substantially opposite to the first direction.

20. The method of claim 12 wherein, the cross bar is made from at least one of fiberglass, poly vinyl chloride (PVC), and chlorinated PVC (CPVC).

\* \* \* \* \*